H. R. DECKER.
DRILL STEM CLAMP FOR ROTARY DRILLING MACHINES.
APPLICATION FILED FEB. 5, 1908.

899,208.                                                  Patented Sept. 22, 1908.

Witnesses                                           Inventor
                                                    Harry R. Decker

UNITED STATES PATENT OFFICE.

HARRY R. DECKER, OF HOUSTON, TEXAS.

DRILL-STEM CLAMP FOR ROTARY DRILLING-MACHINES.

No. 899,208.　　Specification of Letters Patent.　　Patented Sept. 22, 1908.

Application filed February 5, 1908. Serial No. 414,444.

*To all whom it may concern:*

Be it known that I, HARRY R. DECKER, a citizen of the United States, residing at Houston, in the county of Harris and State of Texas, have invented certain new and useful Improvements in Drill-Stem Clamps for Rotary Drilling-Machines, of which the following is a specification.

In drilling oil and water wells in soft formations, alluvial deposits, etc., the machine most generally used is known as a "rotary" and consists of a table having a central opening for the tubular drill stem and a clamp consisting of two frames actuated by right-and-left-threaded screws or other means, each of said frames having elongated cylindrical bearings on which are rotatably mounted steel disks or rings that engage the drill stem and causes it to rotate with the table, but permits longitudinal movement of the stem so as to allow it to accommodate itself to the well boring and also to be raised and lowered mechanically when a hard formation is encountered in the drilling.

My invention consists in mounting the clamping rings or disks on a threaded sleeve which is in turn rotatably mounted on the shaft and the object of my invention is two fold. By having the exterior of the sleeve and the interior of the rings or disks correspondingly threaded admits of adjusting the rings or disks so as to fit any size stem, and by having the bearing the full length of the threaded sleeve equalizes the wear on the shaft and prevents particles of sand, dirt, etc., from getting in the bearing and cutting it.

My invention will be described in detail hereinafter and illustrated in the accompanying drawings in which—

Figure 1:
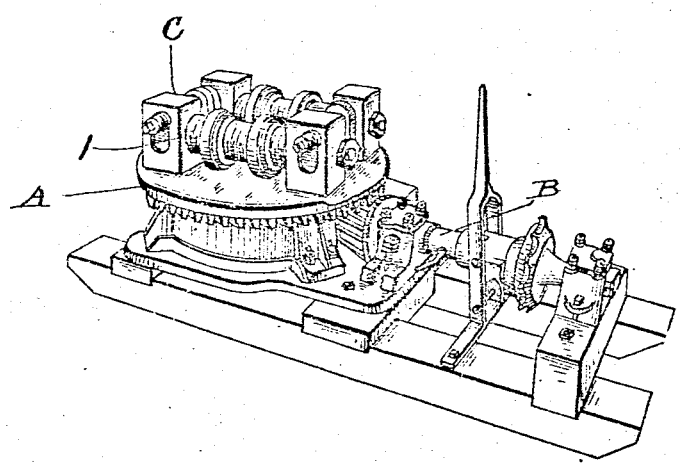
Figure 2:
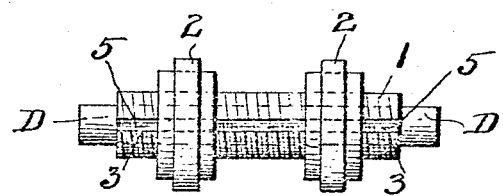
Figure 3:
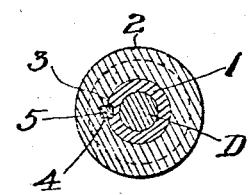

Figure 1 is a view of rotary drilling machine with my improved clamp installed thereon, Fig. 2, a detail view of one of the clamping members, and Fig. 3, a cross section of the clamping member shown in Fig. 2.

In the drawings similar reference characters indicate corresponding parts throughout the several views.

A indicates the rotary table which is turned by means of the shaft B and C the drill stem clamps having shafts D secured thereto. These parts have heretofore been used in rotary drilling machines and I lay no claim thereto but my invention consists in mounting exteriorly threaded sleeves 1 on the shafts D and providing the clamping rings or disks 2 with threaded interiors to engage the threaded outer surface of sleeves 1. 3 indicates a longitudinal groove in the outer surface of each sleeve 1 to form a key seat, 4 a key seat in the disks 2 and 5 a key engaging said key seats to hold the disks 2 in position on the sleeve. By this construction as stated above the wear on shafts D is evenly distributed and as there are no interstices for sand, grit, etc., to get between the sleeve and shaft as in machines in which the clamping rings or disks are mounted directly on the shaft the clamp will last an indefinite time.

Having thus described my invention what I claim is—

1. In combination with a rotary drilling machine and a drill stem clamp mounted thereon having shafts secured thereto, sleeves mounted on said shafts and extending substantially the full length thereof, and clamping devices secured to said sleeves.

2. In combination with a rotary drilling machine and a drill stem clamp mounted thereon having shafts secured thereto, sleeves mounted on said shafts and extending substantially the full length thereof, and clamping rings secured to said sleeves.

3. In combination with a rotary drilling machine, and a drill stem clamp mounted thereon having shafts secured thereto, exteriorly threaded sleeves mounted on said shafts extending substantially the full length thereof, and threaded clamping devices mounted on said sleeves.

4. In combination with a rotary drilling machine, and a drill stem clamp mounted thereon having shafts secured thereto, exteriorly threaded sleeves mounted on said shafts extending substantially the full length thereof, and threaded rings mounted on said sleeves.

5. In combination with a rotary drilling machine, and a drill stem clamp mounted thereon having shafts secured thereto, exteriorly threaded sleeves mounted on said shafts extending substantially the full length thereof, each of said sleeves having a longitudinal key seat therein, threaded rings mounted on said sleeves and having key seats corresponding to the key seat in the sleeve, and a key engaging said key seats.

In testimony whereof I hereto affix my signature in the presence of two witnesses.

HARRY R. DECKER.

Witnesses:
 JAKE H. SAM,
 E. E. GORDON.